United States Patent
Moshchuk et al.

(10) Patent No.: US 8,095,273 B2
(45) Date of Patent: Jan. 10, 2012

(54) AUTONOMOUS PARKING STRATEGY OF THE VEHICLE WITH REAR STEER

(75) Inventors: Nikolai K. Moshchuk, Grosse Pointe, MI (US); Shih-Ken Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 344 days.

(21) Appl. No.: 12/578,616

(22) Filed: Oct. 14, 2009

(65) Prior Publication Data
US 2011/0087405 A1    Apr. 14, 2011

(51) Int. Cl.
*A01B 69/00* (2006.01)
(52) U.S. Cl. .......... 701/41; 180/410; 180/413; 180/408; 180/197; 180/422
(58) Field of Classification Search .............. 701/41; 180/410, 413, 408, 446, 197, 422
See application file for complete search history.

(56) References Cited

U.S. PATENT DOCUMENTS

| | | | |
|---|---|---|---|
| 4,735,274 A | 4/1988 | Good et al. | |
| 5,742,141 A | 4/1998 | Czekaj | |
| 5,748,107 A | 5/1998 | Kersken et al. | |
| 6,483,442 B2 | 11/2002 | Shimizu et al. | |
| 6,906,640 B2 | 6/2005 | Gotzig et al. | |
| 6,948,729 B2 | 9/2005 | Zalila et al. | |
| 2009/0178876 A1* | 7/2009 | Miki et al. | 180/411 |
| 2009/0259365 A1* | 10/2009 | Rohlfs et al. | 701/41 |

* cited by examiner

*Primary Examiner* — Thomas Black
*Assistant Examiner* — Luke Huynh

(57) ABSTRACT

A method includes parallel parking a vehicle between a first object and a second object in response to an available parking distance therebetween. The vehicle includes front steerable wheels and rear steerable wheels. A distance between the first object and the second object is remotely sensed determining whether to apply a one or two cycle parking strategy. An autonomous one cycle parking strategy includes pivoting the front and rear steerable wheels in respective directions for steering the vehicle in a first reverse arcuate path of travel and then cooperatively pivoting the steerable wheels in a counter direction for steering the vehicle in a second reverse arcuate path of travel to a final park position. The autonomous two cycle parking strategy includes performing the one cycle parking maneuver and then changing a transmission gear to a drive gear and pivoting the front and rear steerable wheels in the first direction for moving the vehicle forward to a final park position.

19 Claims, 3 Drawing Sheets

AUTONOMOUS PARKING STRATEGY OF THE VEHICLE WITH REAR STEER

BACKGROUND OF INVENTION

The present invention relates generally to a parking strategy for autonomously parallel parking a vehicle.

Parallel parking a vehicle between two vehicles is often a difficult task for a driver. Semi-autonomous parking systems are vehicle based systems designed to aid the driver in performing difficult parking maneuvers such as parallel parking. Such systems either guide the driver in steering the vehicle through its intended trajectory path or increase/decrease power steering efforts when the driver of the vehicle has deviated from the intended trajectory path. In such systems, the driver is required to control the steering efforts or make some adjustments to the steering wheel.

SUMMARY OF INVENTION

An advantage of an embodiment provides a determination of whether an available parking space between a first and second object is sufficient to parallel park the vehicle using a fully autonomous single cycle steering strategy or a fully autonomous two cycle steering strategy with rear vehicle steer.

An embodiment contemplates a method of controlling a parallel parking of a vehicle between a first object and a second object in response to an available parking distance therebetween. The vehicle has front steerable wheels and rear steerable wheels. A distance between the first object and the second object is remotely sensed. The distance is compared to a first predetermined distance and to a second predetermined distance wherein the first predetermined distance is greater than the second predetermined distance. If the distance is greater than the first predetermined distance, then an autonomous one cycle parking strategy is performed that pivots the front steerable wheels and the rear steerable wheels in respective directions for steering the vehicle in a first reverse arcuate path of travel and then cooperatively pivoting the steerable wheels in a counter direction for steering the vehicle in a second reverse arcuate path of travel to a final park position. If the distance is between the first predetermined distance and the second predetermined distance, then an autonomous two cycle parking strategy is performed. The autonomous two cycle parking strategy includes pivoting the front steerable wheels and the rear steerable wheels in a first direction for cooperatively steering the vehicle in a first reverse arcuate path of travel. The front steerable wheels and rear steerable wheels are pivoted in a counter direction for cooperatively steering the vehicle in a second reverse arcuate path of travel. A transmission gear change is applied for moving the vehicle in a forward direction. The front steerable wheels and the rear steerable wheels are pivoted in the first direction for moving the vehicle forward to a final park position.

An embodiment contemplates an autonomous method for parallel parking a driven vehicle between a first object and a second object. The system includes a controller for autonomously controlling steering of front steerable wheels and rear steerable wheels for parallel parking the driven vehicle. A sensing device detects objects proximate to the driven vehicle. The sensing device is in communication with the controller to provide signals to the controller for identifying a space between the first object and the second object. A distance is determined between the first object and the second object in response to sensing the detected objects. The controller compares the determined distance to a first predetermined distance and a second predetermined distance. The controller determines that a one cycle parking strategy may be used to park the vehicle if the distance is greater than the first predetermined distance. An autonomous one cycle parking strategy is performed that pivots the front steerable wheels and the rear steerable wheels in a first direction for steering the vehicle in a first reverse arcuate path of travel and then cooperatively pivots the steerable wheels in a counter direction for steering the vehicle in a second reverse arcuate path of travel to a final park position.

DETAILED DESCRIPTION

Figure 1:
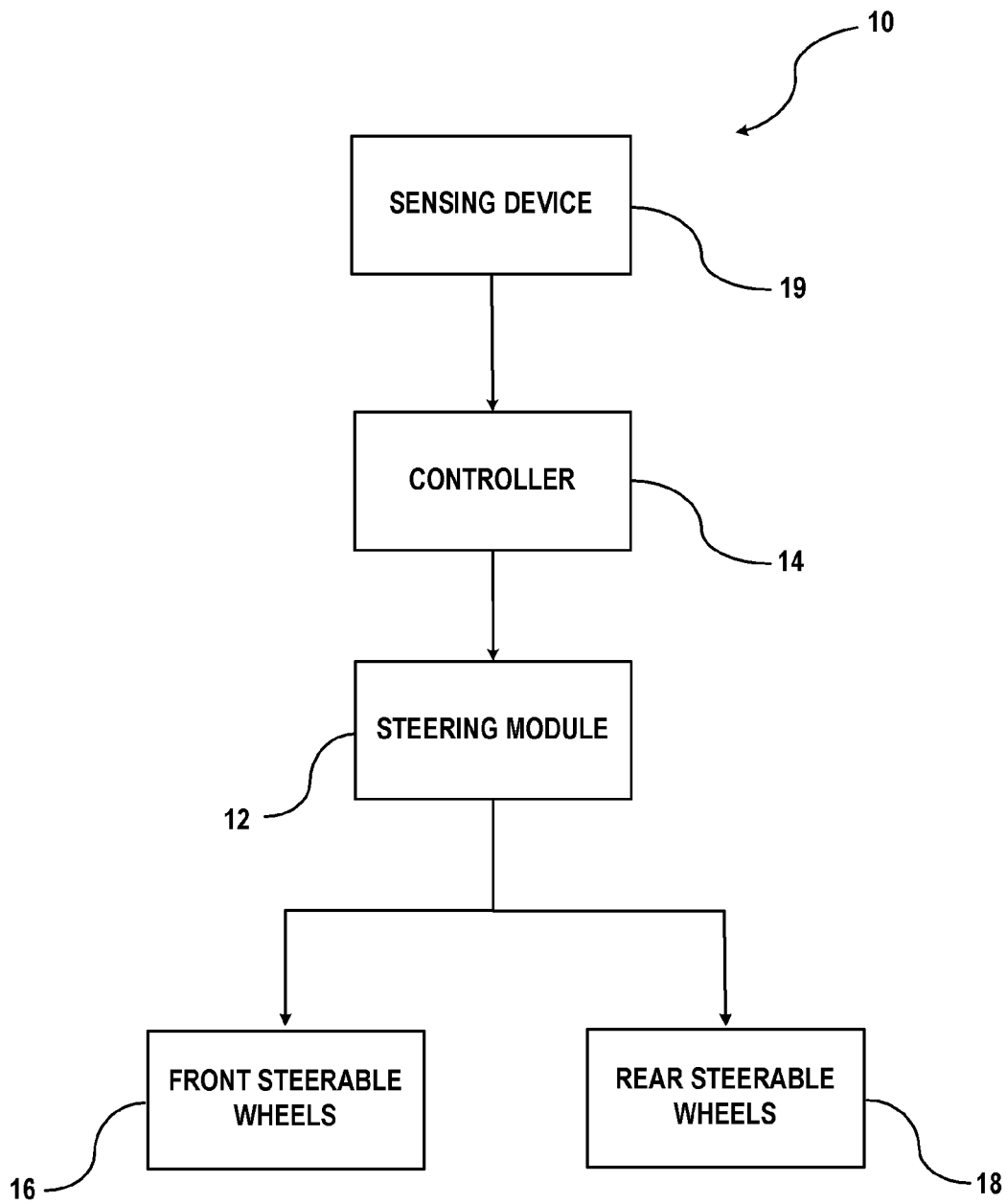
FIG. 1 is a block diagram showing an autonomous parallel parking system according to an embodiment.

There is shown in FIG. 1 an embodiment of an autonomous steering system 10 for parallel parking a vehicle. The autonomous steering system 10 includes a steering module 12 and a controller 14 for controlling front steerable wheels 16 and rear steerable wheels 18 of the vehicle. The steering module 12 may be an electronic module or similar device that is capable of pivoting the front steerable wheels 16 and rear steerable wheels 18 without a driver's steering demand through a steering wheel of the vehicle. The controller 14 provides control input signals to the steering module 12, such as a conventional electronic power steering module, for controlling the pivoting of the steerable wheels during a parking maneuver. The controller 14 may be separate from the steering module 12 or may be integrated within the steering module 12 as a single unit.

The autonomous steering system 10 further includes a sensing device 19 for detecting objects proximate to the driven vehicle. The sensing device 19 detects the presence and non-presence of objects laterally from the vehicle for determining an available parking space between a first object and a second object. The sensing device 19 may include a radar-based sensing device, an ultrasonic-based sensing device, an imaging-based sensing device, or similar device capable of providing a signal characterizing the available space between the objects. The sensing device 19 is in communication with the controller 14 for providing signals to the controller 14. The sensing device 19 may be capable of determining the distance between the respective objects and communicating the determined distance to the controller 14, or the sensing device 19 may provide signals to the controller 14 to be used by the controller 14 to determine the distance of the spacing between the objects.

In response to the determined spacing between the first and second objects, controller 14 determines whether to apply a one cycle parking strategy or a two cycle parking strategy where both respective parking strategies utilize rear steering.

Figure 2:
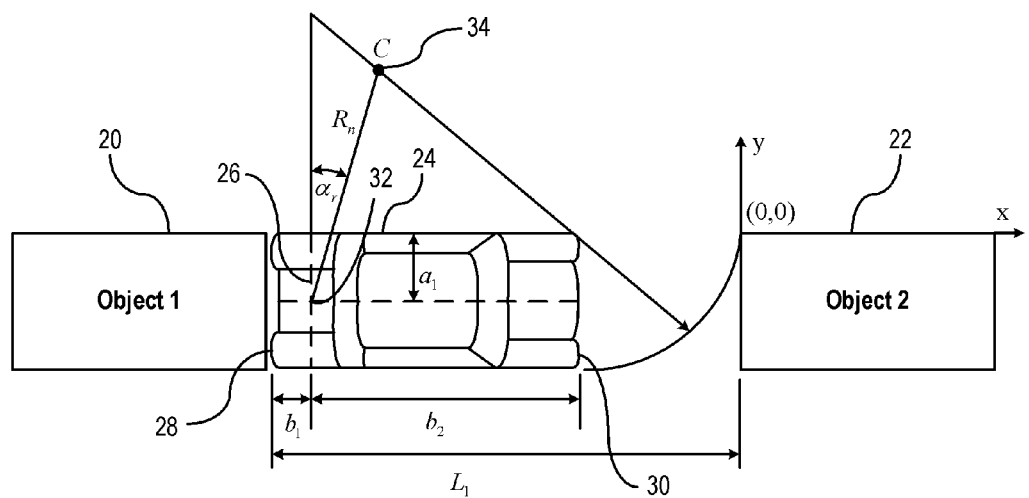
FIG. 2 is a geometric schematic illustrating vehicle parameters for applying a one cycle parking strategy according to the embodiment.

FIG. 2 illustrates a geometric schematic showing vehicle parameters used for determining the minimum spacing required for applying the one cycle parking strategy for a respective vehicle. The model for determining whether the vehicle can be successfully parked utilizing the one cycle parking strategy is based on the assumption that a vehicle parked at a most rearward position in a parking space having a particular length can leave the parking spot utilizing the one cycle parking strategy with both the front steerable wheels and the rear steerable wheels at full steer. That is, if the vehicle can leave the parking space utilizing only the steering operations associated with the one cycle parking strategy, then the vehicle can be parked in the parking space utilizing only the one cycle parking strategy.

The determination for the one cycle parking strategy will be discussed as follows. A first object 20 and the second object 22 are shown having a spacing $L_1$ therebetween. The width of the available parking space is assumed to be a width of the vehicle. A vehicle, illustrated generally by 24, includes a respective vehicle width, vehicle length, and vehicle turning radius at full steer for both the front and rear steerable wheels based on the design of the vehicle chassis. The minimum distance required to apply the one cycle parking strategy is predetermined and is specific to a vehicle based on the vehicle characteristics as described. The formula for determining a first distance $L_1$ (i.e., minimum spacing for applying the one cycle parking strategy) is represented by:

$$L_1 = b_1 + R_n \sin \alpha_r + \sqrt{(b_2 - R_n \sin \alpha_r)^2 + 4aR_n \cos \alpha_r} \qquad (1)$$

where a is half of a width of the vehicle along a rear axle 26; $\alpha_r$ is an angle of the rear steerable wheels 18 at full steer; $b_1$ is a longitudinal distance from a rear 28 of the vehicle to the rear axle 26 of the vehicle; $b_2$ is a longitudinal distance from a front 30 of the vehicle to the rear axle 26 of the vehicle; and $R_n$ is a distance from a midpoint 32 of the rear axle 26 to a center of the turning radius (C) 34. The turning radius, herein, is based on both the front steerable wheels and the rear steerable wheels being at a full steer position. Full steer correlates to the steerable wheels being pivoted to the maximum pivotable position in a respective direction.

Figure 3:
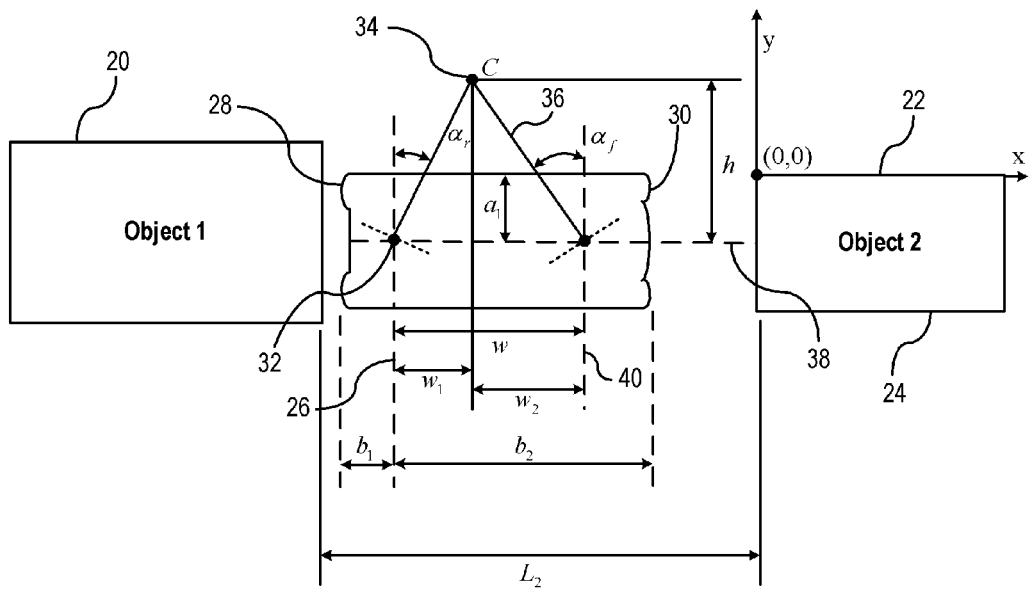
FIG. 3 is a geometric schematic illustrating vehicle parameters for applying a two cycle parking strategy according to the embodiment.

The turning radius $R_n$ of the vehicle from a center turning point (C) to a midpoint 32 of the rear axle 26 when each of the steerable wheels are at their respective full steer angles is determined by the following formula:

$$R_n = w \frac{\cos \alpha_f}{\sin(\alpha_f + \alpha_r)} \qquad (2)$$

where w is a distance between a front axle and a rear axle, $\alpha_f$ is an angle of the front steerable wheels at full steer, and $\alpha_r$ is an angle of the rear steerable wheels at full steer (as shown in FIG. 3).

The determined distance $L_1$ is the minimum distance required between the first object 20 and second object 22 for applying the one cycle parking strategy. If the actual measured distance between the first object 20 and second object 22 is less then the predetermined distance $L_1$, then the one cycle parking strategy is not applied. The one cycle parking strategy cooperatively pivots the front steerable wheels and the rear steerable wheels in a turning direction for moving the vehicle in a first reverse arcuate path of travel and then cooperatively pivots the steerable wheels in a counter direction for steering the vehicle in a second reverse arcuate path of travel to a final park position. It should be understood that the front steerable wheels and rear steering wheels, as described herein, are pivoted in an opposing direction in relation to one another for minimizing the turn radius. No gear change is required in a one cycle parking strategy.

FIG. 3 illustrates a geometric schematic of the vehicle parameters used for determining the minimum spacing required for applying the two cycle parking strategy for a respective vehicle. In the two cycle parking strategy, the front steerable wheels and rear steerable wheels are cooperatively pivoted to their respective full steering angles for moving the vehicle in a first reverse arcuate path of travel. The front steerable wheels and the second steerable wheels are then cooperatively pivoted in the counter direction for steering the vehicle in a second reverse arcuate path of travel. Thereafter, a gear change is performed (i.e., placing the transmission in a drive position) and a respective steering operation for the second cycle of the two cycle parking strategy is performed for moving the vehicle forward to a final park position. Determining whether the vehicle can be successfully parallel parked utilizing the two cycle parking strategy is modeled on a condition of whether the vehicle parked in the available parking space can leave the parking spot utilizing the steering operations associated with the two cycle parking strategy. That is, if the vehicle can only leave the parking space utilizing the steering operations associated with the two cycle parking strategy as opposed to the one cycle parking strategy, then the vehicle can be parallel parked in the parking space utilizing the two cycle parking strategy. The first steering cycle includes the vehicle moving rearward in the available parking space at respective turning angles in a first angular direction and then rotating the steering wheel in a counter direction while continuously traveling rearward until a respective rear corner of the vehicle reaches a respective boundary (e.g., front of the first object 20). The second steering cycle includes the vehicle moving forward until the vehicle reaches a respective rear boundary from the second object 22.

The first object 20 and the second object 22 have a spacing $L_2$ therebetween. The width of the available parking space is assumed to be the width of the vehicle. The minimum space required to apply the two cycle parking strategy is predetermined based on the respective vehicle's characteristics such as those described above. The formula for determining a second distance (i.e., minimum spacing for applying the second steering strategy maneuver) is represented by:

$$L_2 = b_1 \cos \psi + b_2 - w_1(1 - \cos \psi) + (h + a)\sin \psi \qquad (3)$$

where $b_1$ is the longitudinal distance from the rear 28 of the vehicle to the rear axle 26 of the vehicle; $b_2$ is the longitudinal distance from the front 30 of the vehicle to the rear axle 26 of the vehicle; w is a distance between a front axle 40 and the rear axle 26, and $\psi$ is an angle of the vehicle turning during the second cycle of the two cycle parking strategy.

Figure 4:
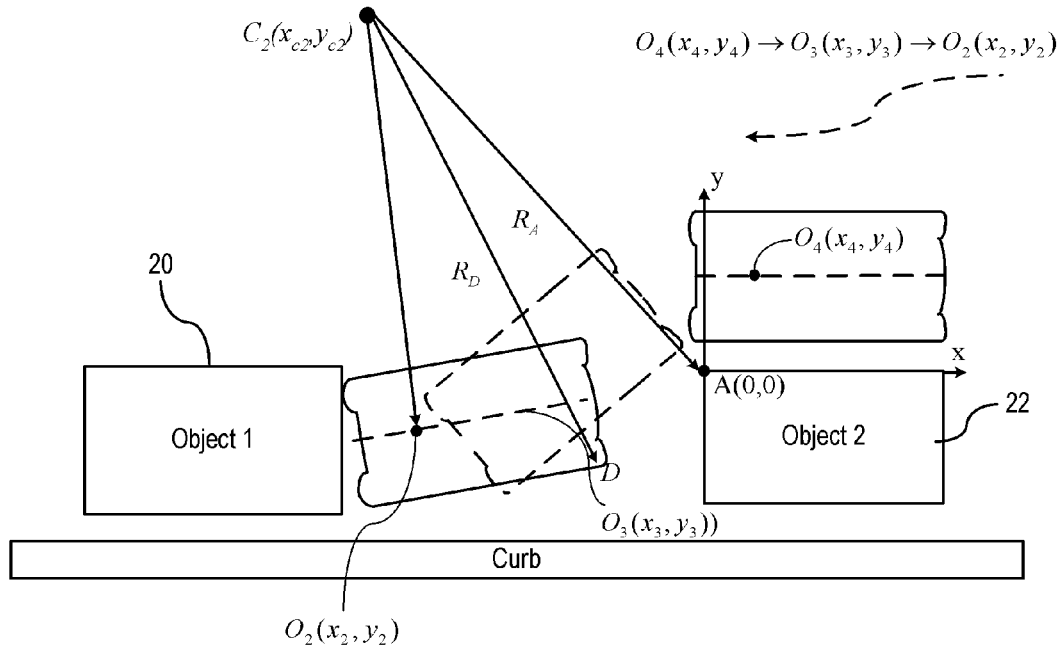
FIG. 4 is a geometric schematic illustrating vehicle parameters for applying a first cycle of the two cycle parking strategy according to the embodiment.
Figure 5:
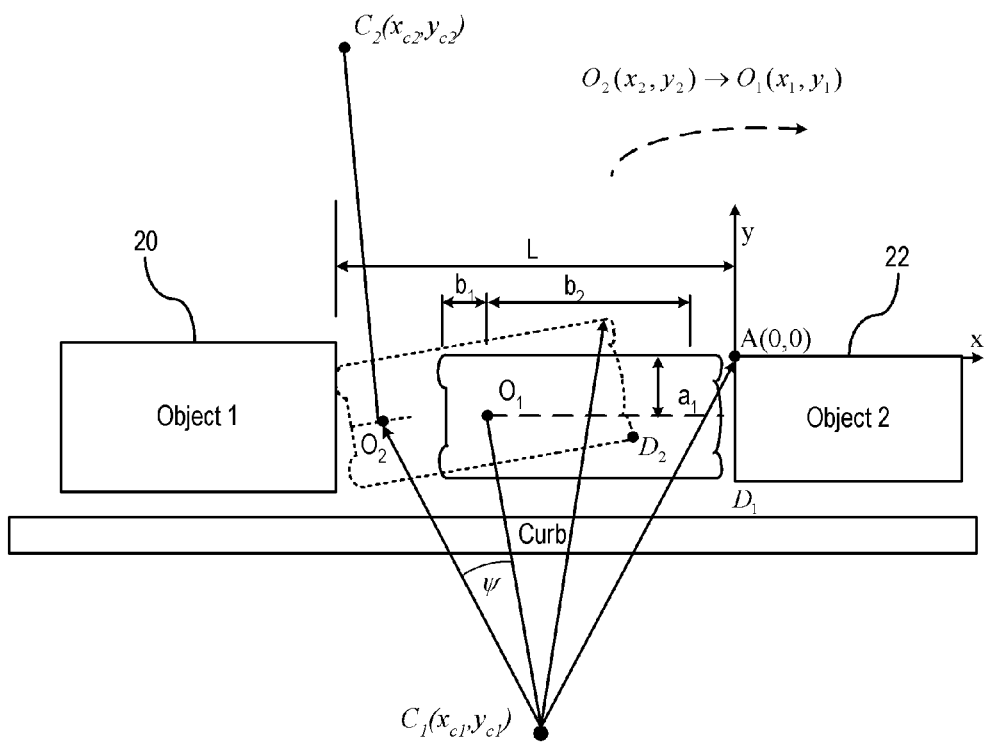
FIG. 5 is a geometric schematic illustrating vehicle parameters for applying a second cycle of the two cycle parking strategy according to the embodiment.

FIGS. 4-5 illustrate the parking of the vehicle from roadway into the available parking space. FIG. 4 illustrates the first cycle of the two cycle parking strategy where the vehicle travels from position $O_4$ to position $O_3$. It should be understood that each respective position $O_x$ represents a vehicle position, more specifically, the location of the vehicle's rear axle midpoint at a respective coordinate (x,y) in the YAX coordinate system. At position $O_3$, the steering wheel is turned in a counter direction until the steerable wheels reach a full steer angle and the vehicle continues to travel rearward until an interim position $O_2$ is reached. At interim position $O_2$, a gear change is made. FIG. 5 illustrates the vehicle traveling from the interim position $O_2$ to the final park position $O_1$. The turn angle of the vehicle $\psi$ is illustrated in FIG. 5. The turn angle of the vehicle $\psi$ is the angle of the vehicle from a center turn point $C_1$ as it travels from the interim position $O_2$ to the final park position $O_1$. That is, the turn angle $\psi$ is the angle that the vehicle travels with respect to center point $C_1$ after the vehicle changes gears (i.e., reverse to drive) and travels from its initial position after the gear change is made to the final parking position within the available parking space. The turn angle $\psi$ required to complete the second cycle of the two cycle parking strategy may be solved for by the following equation:

$$(b_2-w_1+2h\sin\psi)^2+(a+h-2h\cos\psi)^2=(b_2-(b_2-w_1)(1-\cos\psi)-(h-a)\sin\psi-w_1+2h\sin\psi)+(b_2-w_1)\sin\psi-(a+h)\cos\psi)^2 \quad (4)$$

where $b_2$ is the longitudinal distance from the front 30 of the vehicle to the rear axle 26 of the vehicle; a is half of a width of the vehicle along a rear axle 26; $w_1$ is a longitudinal distance between the rear axle 26 and a line 36 extending from a center of turn radius (C) 34 that is perpendicular to the centerline of the vehicle 38; $w_2$ is a longitudinal distance between a front axle 40 and a line 36 extending from a center of turn radius (C) 34 that is perpendicular to the centerline of the vehicle; h is a lateral distance between a centerline of the vehicle 38 and the center of the turn radius (C) 34. The above equation reflects that |CA|=|CD| such that the right front corner D of the vehicle can clear the left rear corner A of the object 22.

Once the turn angle $\psi$ has been solved for in eq. (4), the turn angle $\psi$ may be substituted in eq. (3) to determine the second distance $L_2$. The second distance $L_2$ is the minimum distance required between the first object 20 and second object 22 for applying the two cycle parking strategy. If the actual measured distance between the first object 20 and second object 22 is less then the second distance $L_2$, then the two cycle parking strategy is not applied.

The steering module 12 (shown in FIG. 1) performs a control action for parallel parking the vehicle based on the determination of whether to apply the one cycle parking strategy or the two cycle parking strategy given the distance between the first and second objects. If the determined spacing between the objects is insufficient to perform the parking operation for the one cycle parking strategy or the two cycle parking strategy, then no control action is performed and the system will continue to monitor for a next available parking space.

While certain embodiments of the present invention have been described in detail, those familiar with the art to which this invention relates will recognize various alternative designs and embodiments for practicing the invention as defined by the following claims.

What is claimed is:

1. A method of controlling a parallel parking of a vehicle between a first object and a second object in response to an available parking distance therebetween, the vehicle having front steerable wheels and rear steerable wheels, the method comprising the steps of:

remotely sensing a distance between the first object and the second object;

comparing the distance to first predetermined distance and a second predetermined distance wherein the first predetermined distance is greater than the second predetermined distance;

if the distance is greater than the first predetermined distance, then performing an autonomous one cycle parking strategy that pivots the front steerable wheels and the rear steerable wheels in respective directions for steering the vehicle in a first reverse arcuate path of travel and then cooperatively pivoting the front steerable wheels and rear steerable wheels in a counter direction for steering the vehicle in a second reverse arcuate path of travel to a final park position; and if the distance is between the first predetermined distance and the second predetermined distance, then performing an autonomous two cycle parking strategy, the autonomous two cycle parking strategy comprising:

pivoting the front steerable wheels and the rear steerable wheels in respective directions for cooperatively steering the vehicle in a first reverse arcuate path of travel;

pivoting the front steerable wheels and rear steerable wheels in a counter direction for cooperatively steering the vehicle in a second reverse arcuate path of travel;

applying a transmission gear change for moving the vehicle in a forward direction; and pivoting the front steerable wheels and the rear steerable wheels in the first direction for moving the vehicle forward to a final park position.

2. The method of claim 1 wherein the front steerable wheels are pivoted to a full steer angle and the rear steerable wheels are pivoted to a full steer angle.

3. The method of claim 2 wherein the first predetermined distance $L_1$ used to determine whether to apply the single cycle steering strategy is derived from the following equation:

$$L_1=b_1+R_n\sin\alpha_r+\sqrt{(b_2-R_n\sin\alpha_r)^2+4aR_n\cos\alpha_r}$$

where a is half of a width of the vehicle along a rear axle; $\alpha_r$ is an angle of the rear steerable wheels at full steer, $b_1$ is a longitudinal distance from a rear of the vehicle to the rear axle of the vehicle; $b_2$ is a longitudinal distance from a front of the vehicle to the rear axle of the vehicle; and $R_n$ is a distance from a midpoint of the rear axle to a center of the turning radius.

4. The method of claim 3 wherein the distance from a midpoint of the rear axle to the center of the turning radius is derived from the following equation:

$$R_n = w\frac{\cos\alpha_f}{\sin(\alpha_f+\alpha_r)}$$

where w is a distance between a front axle and a rear axle, $\alpha_f$ is an angle of the front steerable wheels at full steer, and $\alpha_r$ is an angle of the rear steerable wheels at full steer.

5. The method of claim 3 wherein the distance from a midpoint of the rear axle to the center of the turning radius is derived from the following equation:

$$(b_2-w_1+2h\sin\psi)^2+(a+h-2h\cos\psi)^2=(b_2-(b_2-w_1)(1-\cos\psi)-(h-a)\sin\psi-w_1+2h\sin\psi)+(b_2-w_1)\sin\psi-(a+h)\cos\psi)^2$$

where $b_2$ is the longitudinal distance from the front of the vehicle to the rear axle of the vehicle; a is half of a width of the vehicle along a rear axle; $w_1$ is a longitudinal distance between the rear axle and a line extending from a center of turn radius that is perpendicular to the centerline of the vehicle; and $w_2$ is a longitudinal distance between a front axle and a line extending from a center of turn radius that is perpendicular to the centerline of the vehicle; h is lateral distance between a centerline of the vehicle and the center of the turn radius; $\psi$ is a vehicle turn angle about a center point as the vehicle travels from a respective position to a final park position.

6. The method of claim 5 wherein the second predetermined distance $L_2$ used to determine whether to apply the two cycle parking strategy is derived from the following equation:

$$L_2 = b_1 \cos \psi + b_2 - w_1(1 - \cos \psi) + (h+a)\sin \psi$$

where $b_1$ is the longitudinal distance from the rear of the vehicle to the rear axle of the vehicle; $b_2$ is the longitudinal distance from the front of the vehicle to the rear axle of the vehicle; w is a distance between a front axle and the rear axle, and $\psi$ is the vehicle turn angle about the center point as the vehicle travels from a respective position to a final park position.

7. The method of claim 1 wherein data obtained from an ultrasonic sensing device is used to determine a distance between the first object and the second object.

8. The method of claim 1 wherein radar data obtained from a radar device is used to determine a distance between the first object and the second object.

9. The method of claim 1 wherein imaging data is used to determine a distance between the first object and the second object.

10. An autonomous parking system for parallel parking a driven vehicle between a first object and a second object, the system comprising:
a controller for autonomously controlling steering of front steerable wheels and rear steerable wheels for parallel parking the driven vehicle, and
a sensing device for detecting objects proximate to the driven vehicle, the sensing device in communication with the controller to provide signals to the controller for identifying a space between the first object and the second object;
wherein a distance is determined between the first object and the second object in response to sensing the detected objects, wherein the controller compares the determined distance to a first predetermined distance and a second predetermined distance, wherein the controller determines that a one cycle parking strategy may be used to park the vehicle if the distance is greater than the first predetermined distance; wherein an autonomous one cycle parking strategy is performed that pivots the front steerable wheels and the rear steerable wheels in a first direction for steering the vehicle in a first reverse arcuate path of travel and then cooperatively pivots the steerable wheels in a counter direction for steering the vehicle in a second reverse arcuate path of travel to a final park position.

11. The autonomous parking system of claim 10 wherein the wherein the controller determines that an autonomous two cycle parking strategy may be used to park the vehicle if the distance is between the first predetermined distance and the second predetermined distance, the autonomous two cycle parking strategy including pivoting the front steerable wheels and the rear steerable wheels in a first direction for cooperatively steering the vehicle in a first reverse arcuate path of travel, pivoting the front steerable wheels and rear steerable wheels in a counter direction for cooperatively steering the vehicle in a second reverse arcuate path of travel, applying a transmission gear change for moving the vehicle in a forward direction; and pivoting the front steerable wheels and the rear steerable wheels in the first direction for moving the vehicle forward to a final park position.

12. The autonomous parking system of claim 11 wherein the first predetermined distance $L_1$ is derived from the following equation:

$$L_1 = b_1 + R_n \sin \alpha_r + \sqrt{(b_2 - R_n \sin \alpha_r)^2 + 4aR_n \cos \alpha_r}$$

where a is half of a width of the vehicle along a rear axle; $\alpha_r$ is an angle of the rear steerable wheels at full steer, $b_1$ is a longitudinal distance from a rear of the vehicle to the rear axle of the vehicle; $b_2$ is a longitudinal distance from a front of the vehicle to the rear axle of the vehicle; and $R_n$ is a distance from a midpoint of the rear axle to a center of turning radius.

13. The autonomous parking system of claim 12 wherein the distance from a midpoint of the rear axle to the center of the turning radius is derived from the following equation:

$$R_n = w \frac{\cos \alpha_f}{\sin(\alpha_f + \alpha_r)}$$

where w is a distance between a front axle and a rear axle, $\alpha_f$ is an angle of the front steerable wheels at full steer, and $\alpha_r$ is an angle of the rear steerable wheels at full steer.

14. The autonomous parking system of claim 13 wherein the distance from a midpoint of the rear axle to the center of the turning radius is derived from the following equation:

$$(b_2 - w_1 + 2h \sin \psi)^2 + (a+h-2h \cos \psi)^2 = (b_2 - (b_2 - w_1)(1 - \cos \psi) - (h-a)\sin \psi - w_1 + 2h \sin \psi) + (b_2 - w_1)\sin \psi - (a+h)\cos \psi)^2$$

where $b_2$ is the longitudinal distance from a front of the vehicle to the rear axle of the vehicle; a is half of a width of the vehicle along the rear axle; $w_1$ is a longitudinal distance between the rear axle and a line extending from a center of turn radius that is perpendicular to a centerline of the vehicle; and $w_2$ is a longitudinal distance between the front axle and a line extending from a center of turn radius that is perpendicular to a centerline of the vehicle; h is lateral distance between a centerline of the vehicle and the center of the turn radius; $\psi$ is a vehicle turn angle about a center point as the vehicle travels from a respective position to a final park position.

15. The autonomous parking system of claim 14 wherein the second predetermined distance $L_2$ used to determine whether to apply the two cycle parking strategy is derived from the following equation:

$$L_2 = b_1 \cos \psi + b_2 - w_1(1 - \cos \psi) + (h+a)\sin \psi$$

where $b_1$ is the longitudinal distance from the rear of the vehicle to the rear axle of the vehicle; $b_2$ is the longitudinal distance from the front of the vehicle to the rear axle of the vehicle; w is a distance between a front axle and the rear axle, and $\psi$ is a vehicle turn angle about a center point as the vehicle travels from a respective position to a final park position.

16. The autonomous parking system of claim 11 further comprising an electric power steering system for providing steering torque to the steerable wheels of the vehicle.

17. The autonomous parking system of claim 11 wherein the sensing device includes a radar-based sensing device.

18. The autonomous parking system of claim 11 wherein the sensing device includes an ultrasonic based sensing device.

19. The autonomous parking system of claim 11 wherein the sensing device includes an image based sensing device.

* * * * *